United States Patent [19]

Suzuki et al.

[11] Patent Number: 5,788,731
[45] Date of Patent: Aug. 4, 1998

[54] PROCESS FOR MANUFACTURING A CRYSTALLIZED GLASS SUBSTRATE FOR MAGNETIC DISCS

[75] Inventors: Tomio Suzuki, Yokkaichi; Fuminori Takeya, Iwakura, both of Japan

[73] Assignee: NGK Insulators, Ltd., Japan

[21] Appl. No.: 724,649

[22] Filed: Oct. 1, 1996

[30] Foreign Application Priority Data

Oct. 5, 1995 [JP] Japan ................. 7-258792

[51] Int. Cl.⁶ ............ C03B 27/012; C03B 32/00; C03B 21/00; C03B 23/00
[52] U.S. Cl. ............... 65/32.1; 65/32.3; 65/33.1; 65/63; 65/102
[58] Field of Search ................. 65/32.1, 32.3, 65/33.1, 33.7, 33.8, 63, 102, 111

[56] References Cited

U.S. PATENT DOCUMENTS

| | | | |
|---|---|---|---|
| 3,833,347 | 9/1974 | Angle et al. | 65/32.5 |
| 3,998,617 | 12/1976 | Gliemeroth | 65/33 |
| 4,118,214 | 10/1978 | Wedding | 65/30 R |
| 5,147,436 | 9/1992 | Blakeslee et al. | |
| 5,188,677 | 2/1993 | Fukai et al. | 148/501 |
| 5,391,522 | 2/1995 | Goto et al. | 501/4 |
| 5,532,194 | 7/1996 | Kawashima et al. | 65/33.7 |
| 5,567,217 | 10/1996 | Goto et al. | 65/33.8 |
| 5,580,363 | 12/1996 | Goto et al. | 65/33.8 |

*Primary Examiner*—Peter Chin
*Assistant Examiner*—Jacqueline A. Ruller
*Attorney, Agent, or Firm*—Wall Marjama & Bilinski

[57] ABSTRACT

A process for producing a crystallized glass substrate for magnetic disks, including the steps of: (a) holding an amorphous glass plate having a uniform thickness and two principal flat surfaces thereof between a pair of pressing setters in a sandwiched fashion, which pressing setters are non-reactive with the amorphous glass and undeformable during heating for crystallization of the amorphous glass; (b) softening the amorphous glass plate in a sandwiched stack form by heating at a temperature above an annealing point of the amorphous glass, whereby the principal surfaces are fitted onto the flat surfaces of the pressing setters to rectify warping to flatten the amorphous glass plate; and (c) then, increasing the temperature to a crystal growth temperature to grow crystals within the amorphous glass, whereby the amorphous glass plate is crystallized as maintaining its warp-free state, followed by solidifying.

6 Claims, 4 Drawing Sheets

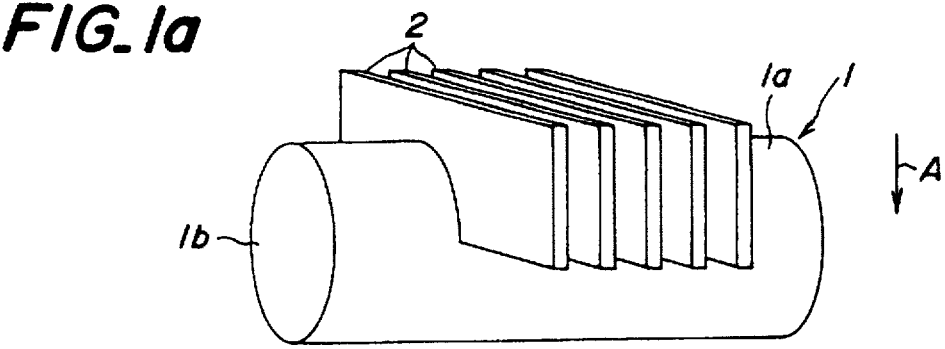
FIG_1a
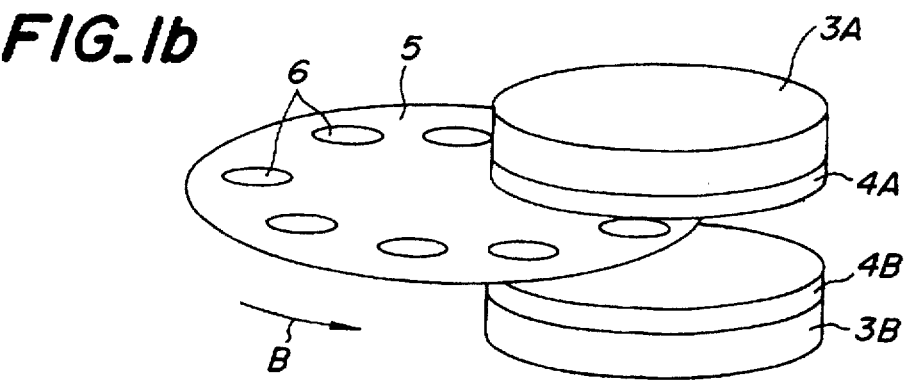
FIG_1b
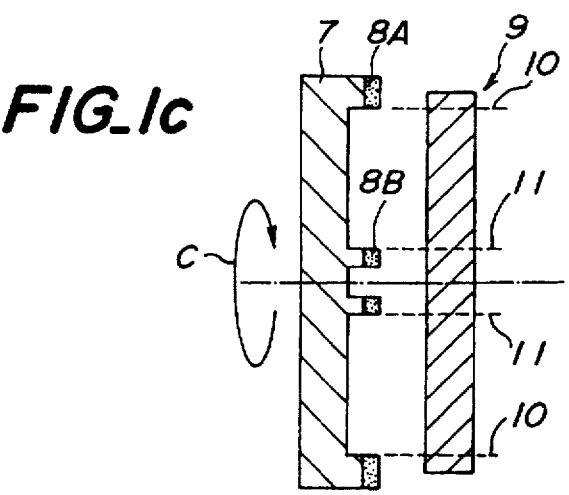
FIG_1c a: -41.4μm          b: -31.2μm a: 43.8μm           b: 33.6μm

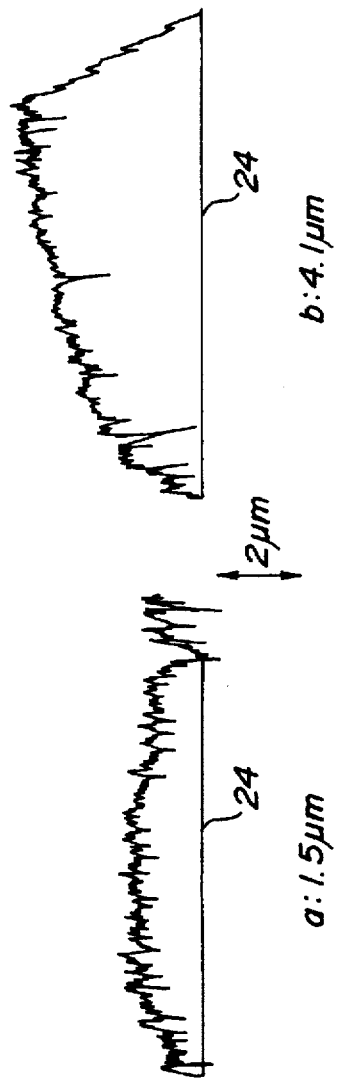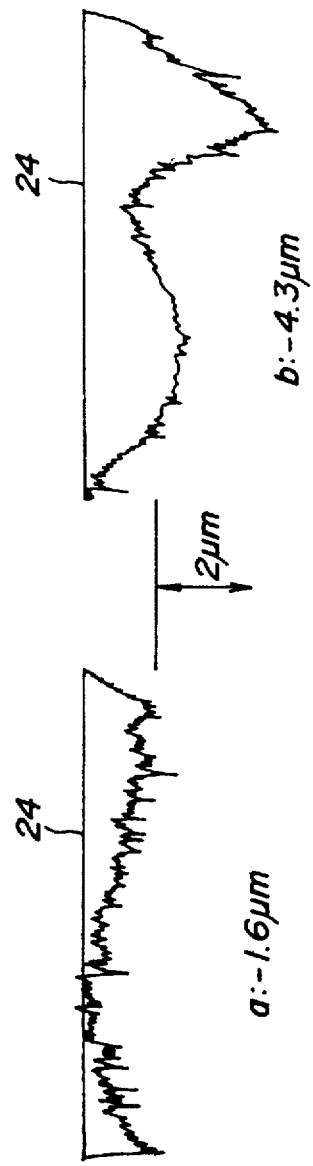

PROCESS FOR MANUFACTURING A CRYSTALLIZED GLASS SUBSTRATE FOR MAGNETIC DISCS

BACKGROUND OF THE INVENTION

1. Field of the Invention

The present invention relates to a process for manufacturing crystallized glass substrates for magnetic disks.

2. Description of the Prior Art

Main component elements of magnetic storages such as computers or the like are magnetic recording media and magnetic heads for reproducing magnetic records. As a material for hard disk substrates as the magnetic recording media, mainly aluminum alloys have been extensively employed. However, the flying height of the magnetic heads has been noticeably decreased with recent miniaturization of hard-disk drives. Consequently, a smoothness of extremely high precision has been required with respect to the surface of the magnetic disks. In general, the maximum height of the ruggedness on the surfaces of the magnetic disks should not exceed a half of the flying height of the magnetic disks. For example, in hard-disk drives with a flying height of 75 nm, the allowable maximum height of the ruggedness on the surfaces of the disks must be less than 38 nm. Particularly, recently, it has been required to restrict the Center-line Mean Roughness (Ra) defined in JIS B 0601, within 20 angstroms or less, in the read/write zone on the substrates of the magnetic disks. However, in the case of aluminum alloy substrates, their hardness is so low that ground surfaces are susceptible to plastic deformation, even when an abrasive finishing is conducted using abrasive grains and machine tools with a high precision. Therefore, it is difficult to produce flat surfaces with a precision higher than a certain level. Even if the surfaces of the aluminum alloy substrates are plated with nickel-phosphorus, flat surfaces on a level as mentioned above would not be able to be formed.

Furthermore, with recent progress of the miniaturization and thickness-reduction of hard-disk drives, it has been strongly demanded to decrease the thickness of the substrates for magnetic disks. However, since aluminum alloys have low strength and stiffness, it is difficult to decrease the thickness of the disks while maintaining a predetermined strength which is required from the specification of the hard-disk drives. Particularly, when the substrates for magnetic disks are finished to be 0.5 mm thick or less, problems are posed such that the substrates may warp due to the deficiency of the strength thereof or the surfaces of the substrates vibrate during high speed revolving or at the start-up of the apparatus.

In order to solve the above problems, substrates for magnetic disks, which are made of glass material, have been partly put to practical use. However, since the substrates for magnetic disks for HDD require particularly a high strength, it is necessary to use tempered glasses such as chemically tempered glasses, glass-ceramics or the like. By using these materials, magnetic recording surfaces having an extremely small Ra of 20 angstroms or less can be formed.

Examples of the glasses for constituting the substrates for magnetic disks include chemically tempered glasses such as soda lime glasses or the like, crystallized glasses, non-alkali glasses and alumino-silicate glasses. Amongst the above, the chemically tempered glasses and crystallized glasses are preferred in view of the high strength thereof.

Particularly, the crystallized glasses, since their hardness and bending strength are uniform, are more excellent in reliability in strength than the chemically tempered glasses. It is much preferred particularly when the thickness of the substrates for magnetic disks is reduced to 0.5 mm or less, as a desired strength is maintained.

However, in mass-production of such substrates for magnetic disks made of a crystallized glass, the following problems have been realized. Namely, in conventional manufacturing processes, for example, when glass substrates having a diameter of 65 mm are produced, at first, a mass of molten glass is cast into a mold and pressed to provide an amorphous glass disk-shaped body about 1.2–1.5 mm thick. Alternatively, a columnar shaped body of amorphous glass is cut into disk-shaped plates of amorphous glass, and further, if required, the plates of amorphous glass are ground or abraded to provide a glass disk about 1.2–1.5 mm thick. These plates of amorphous glass are heated to crystallize and semi-finished products before abrasive finishing (the so-called "blanks") are produced. And then, both surfaces of the blanks are abrasive-finished, namely, both the top and bottom surfaces of the blanks are concurrently lapped and polished to provide finished crystallized glass substrates for magnetic disks, for example, 0.635 mm thick.

Namely, in order that the semi-finished products (blanks) obtained by crystallizing an amorphous glass are finished into final products (crystallized glass substrates for magnetic disks), a half or more, indeed, of the thickness of the blanks must be removed by abrasion. Moreover, the hardness of the glasses after crystallization is appreciably higher than that before crystallization, so that it takes a long time to abrade the blanks. Consequently, a problem such as a remarkable increase in the cost of production has arisen. Naturally, in order to decrease this cost, it is preferred to finish glasses as thin as possible when they are in the amorphous state. However, in the case where the crystallization is merely conducted in this state, glass plates may warp on the stage of crystallization and it is almost impossible to rectify the warp by means of abrasion of both surfaces of the plates. Moreover, the thinner the blanks are made, the more difficult it is to rectify the warp. Therefore, in conventional processes, blanks have been produced necessarily by crystallizing an amorphous glass plate having a thickness of a certain extent (i.e. a thickness of about 1.2–1.5 mm).

Additionally, the degree of flatness required for magnetic disk substrates, for example, having a diameter of 65 mm is generally 5 μm or less across the diameter.

SUMMARY OF THE INVENTION

The object of the present invention is to solve the above-mentioned problems by substantially decreasing abrasion losses of crystallized glass plates after crystallization and improving the cost of production of the crystallized glasses.

The above object is achieved, according to the present invention, by a process for manufacturing crystallized glass substrates for magnetic disks, which process comprises the sequential steps of:

holding an amorphous glass plate having substantially a uniform thickness and two principal surfaces thereof between a pair of pressing setters each having a flat surface, in a fashion that each of said principal surfaces of the amorphous glass plate is brought into contact with said flat surface of the pressing setter, said pressing setters being non-reactive with said amorphous glass and undeformable during crystallization by heading of said amorphous glass;

softening said amorphous glass plate in the above state by heating at a temperature above an annealing point of a glass material of said amorphous glass, whereby said principal surfaces of the amorphous glass plate are firmly fitted onto said flat surfaces of said pressing setters, respectively, to rectify warping of said amorphous glass plate;

then, increasing the temperature of said amorphous glass plate to a crystal growth temperature to grow crystals within said glass material, thereby to crystallize said amorphous glass plate as maintaining its warp-free state, followed by solidifying the crystallized glass plate.

Namely, according to the present invention, the glass plate is abraded when the glass is in the amorphous state, that is, relatively low in hardness and so being readily abradable. This amorphous glass plate is then readily finished to have a uniform thickness close to an objective thickness of crystallized glass substrates for magnetic disks, i.e. final products, and the amorphous glass plate is crystallized simultaneously with improvement in flatness thereof, i.e., rectification of any warp present in the amorphous glass plate after abrasion. Thus, abrasion losses can be extremely decreased in processes of finishing the so-called blanks having an increased hardness after crystallization into the final products.

Through the specification and appended claims of this invention, the phrase "substantially a uniform thickness" with respect to the amorphous glass plate, should be understood to mean the deviation of the thickness being within ±10 μm.

BRIEF DESCRIPTION OF THE DRAWING

The above and other objects, features and advantages of the present invention will become more apparent from reading the following description of the preferred embodiments taken in connection with the accompanying drawings, wherein:

FIG. 1a is a slant view schematically showing a process for cutting out disk-shaped bodies having a predetermined thickness from a large-size columnar shaped body 1;

FIG. 1b is a slant view schematically showing an operation of abrasion conducted with a jig held between a grinding wheel 4A on a top force 3A and a grinding wheel 4B on a bottom force 3B;

FIG. 1c is a cross-sectional view schematically showing a grinding operation of the outer and inner circumferential portions of a shaped body after abrasion;

FIG. 4a shows graphs each depicting a profile of an abraded surface of a substrate after crystallizing treatment; and FIG. 4b shows graphs each depicting a profile of another abraded surface of the substrate.

DESCRIPTION OF THE PREFERRED EMBODIMENTS

Figure 2:
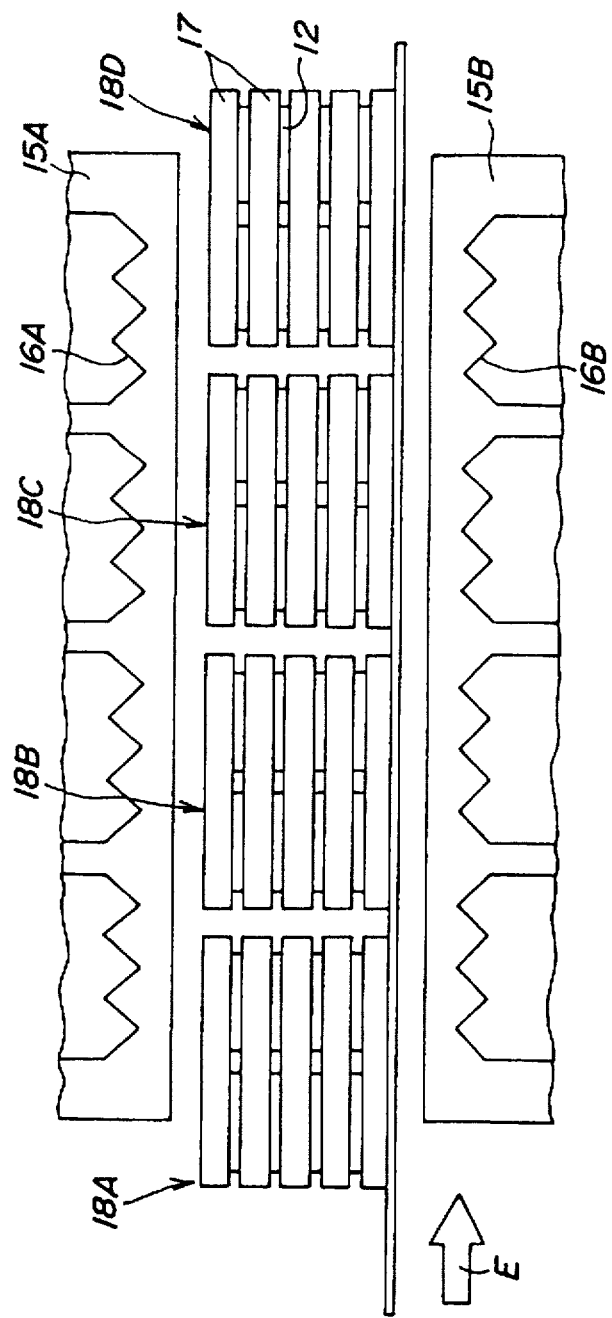
FIG. 2 is a schematic view showing a heat treatment furnace which is suited for mass-production.

At first, molten glass is cast into a mold and cooled to produce a columnar shaped body. The shaped body is cut with a bandsaw, jig saw, inner diameter blade slicing machine, or the like, to produce disk-shaped amorphous glass plates. In FIG. 1a, a method for cutting with a bandsaw is schematically shown. A columnar large-size shaped body 1 has a pair of parallel end surfaces 1b and a cylindrical surface 1a. Cutter blades 2 are forced into the shaped body 1 from the cylindrical surface 1a along the direction parallel with each end surface 1b as shown by the arrow A, to cut out disk-shaped bodies having a predetermined thickness.

A cutter device to be employed here is adequately selected from those described above. If the disk-shaped amorphous glass plates obtained by cutting have little deviation of thickness, the glass plates can be delivered directly to the crystallization step, without necessitating a subsequent step of grinding- or abrasive-finishing. Both the cut surfaces of the thus obtained disk-shaped amorphous glass plates are ground or abrasive-finished to remove the ruggedness formed on the cut surfaces when cutting, and thus amorphous glass plates of a uniform thickness having two principal surfaces are provided.

The grinding- or abrasive-finishing method in this stage is not specifically restricted. However, in general, as shown in FIG. 1b, each of the amorphous glass plates 6 can be ground into a predetermined thickness, by holding a carrier 5 between a grinding wheel 4A on a top force 3A and a grinding wheel 4B on a bottom force 3B, fixing each of the cut amorphous glass plates 6 on the carrier 5 and revolving the carrier 5 in the direction shown by the arrow B.

In the present invention, the crystallized glass substrates for magnetic disks are manufactured by crystallizing the amorphous glass plates which have been abrasive- or grinding-finished to have a predetermined thickness, and then subjecting the resulting crystallized glass plates to a final abrasive-processing (lapping or polishing). In order to decrease final abrasion losses as much as possible, it is preferred that the difference in thickness between the finished amorphous glass plate and the final product, i.e., a crystallized glass substrate for magnetic disks, is made to be 0.1 mm (100 μm) or less, more preferably, 0.05 mm (50 μm) or less. In other words, it is preferred to use an amorphous glass plate thick enough to allow an abrasion loss of thickness within 100 μm, preferably within 50 μm, in abrasive- or grinding-processing of the crystallized glass plate. For example, when the crystallized glass substrate for magnetic disks has a diameter of 65 mm, the thickness of the final products is typically 0.635 mm. In this instance, the thickness of the finished amorphous glass plate is preferred to be at most 0.735 mm, more preferably at most 0.685 mm.

Furthermore, the thickness of the finished amorphous glass plates is preferred to be uniform, having a deviation within ±10 μm. Additionally, in this invention, since warp (i.e., unevenness) is rectified in the subsequent step (i.e., crystallization step), warping of the amorphous glass plate at this stage is not a concern.

Next, the amorphous glass plate ground or abrasive-finished is held between a pair of pressing setters made of carbon, each having a flat surface of flatness of 10 μm or less (preferably, 5 μm or less) over its width of 65 mm, to form a sandwiched body. This sandwiched body is put into an oven with a nitrogen atmosphere inside and heated to a crystallization temperature so that the amorphous glass may be once softened and fitted firmly onto the flat surfaces of the carbon pressing setters, whereby warp is rectified, and then gradually crystallized as the rectified shape is maintained until solidification.

In this instance, carbon is employed as a material for the pressing setters, so that when the amorphous glass plate is sandwiched with a pair of pressing setters and heated to soften in an inert atmosphere, the carbon pressing setters would not react with the amorphous glass plate, and moreover, since the carbon material has a low hardness, when the surface of the pressing setters is finished to be made flat, a high flatness can be readily obtained by abrasive-finishing. Furthermore, as the material for the pressing setters, use may be made of any materials other than carbon, as far as they neither react with nor bond to the glass and are chemically and mechanically stable at crystallization temperatures. Materials, such as carbon-coated ceramics, can preferably be used.

Furthermore, in this instance, since nitrogen, i.e., an inert atmosphere, is used inside the oven, deterioration of the pressing setters induced by a reaction between the carbon and oxygen during heating is effectively prevented. From this viewpoint, the atmosphere also may be a reducing atmosphere.

In addition, the practical substrates for magnetic disks require finishing for providing the outer diameter of the substrates with accuracy and boring a round aperture for setting in the center of the disks. Furthermore, it is necessary to chamfer the outer circumference of the disks and the inner circumference of the round aperture (not shown). Such processing can be conducted in either state of amorphous glass or crystallized glass. However, since amorphous glass is easier to process as compared with crystallized glass, it is preferred that the above processing is conducted in the state of amorphous glass.

FIG. 1c is a cross-section schematically showing an operation of finishing the outer and inner circumferences of an amorphous glass plate before crystallization. The flat surface to be abraded of a shaped body 9 is made to face a processing tool 7. The processing tool 7 is attached with ring- or annular-shaped diamond wheel 8A and inner diamond wheel 8B. The surface to be abraded is brought into contact with the grinding wheels and the processing tool 7 is revolved, for example, in the direction shown by the arrow C. Thereby, an outer peripheral portion defined by the broken lines 10 of the shaped body 9 is removed and the outer peripheral dimension of the shaped body is controlled according to a predetermined specification. Simultaneously therewith, a central portion defined by the broken lines 11 is removed to form a round aperture having predetermined shape and dimension.

Alternatively, in the case where the crystallization of the amorphous glass is conducted on a large scale, it is necessary to treat continuously a number of amorphous glass plates, as a whole, simultaneously. Accordingly, it is preferred that flat-shaped pressing setters are used, these pressing setters and amorphous glass plates are alternatively stacked to form a multi-layered body and a number of the multi-layered bodies are treated as a whole in the oven. Alternatively, it is also preferred that a tunnel furnace is used for continuously treating a number of the multi-layered bodies traveling therethrough. In FIG. 2, such a mass-productive process is schematically shown.

In the heat treatment furnace shown in FIG. 2, an upper oven 15A is provided therein with a heater 16A and a lower oven B is provided therein with a heater 16B. Each multi-layered body, 18A, 18B, 18C or 18D, is composed of pressing setters 17 and amorphous glass plates 12 alternately stacked between the pressing setters. On the top and the bottom of the multi-layered body, the pressing setters 17 are arranged, respectively. The multi-layered bodies can travel towards the direction shown by the arrow E, by transfer means not shown, such as a conveyor or the like. The temperature inside the furnace is controlled according to each condition in the steps of heating up from room temperature, heating up to temperatures above an annealing point, and heating up to crystallization temperatures, of the multi-layered bodies.

The obtained blanks made of crystallized glass are finished by conventional lapping and polishing to provide crystallized glass substrates for magnetic disks with predetermined thickness, flatness and surface roughness.

Examples of the crystallized glass suited for manufacturing the substrates for magnetic disks according to the present invention include $Li_2O$—$Al_2O_3$—$SiO_2$—based crystallized glasses or the like, as shown hereinbelow.

The present invention will be further explained in more detail by way of example hereinafter. However, it should be understood that these examples are not intended to limit the invention:

EXAMPLE 1

Powders of various metal carbonates and the like were mixed together in such a proportion by weight of oxides as 76.1 weight % of $SiO_2$, 11.8 weight % of $Li_2O$, 7.1 weight % of $Al_2O_3$, 2.8% weight % of $K_2O$, 2.0 weight % of $P_2O_5$ and 0.2 weight % of $Sb_2O_3$. The mixture was melted by heat-treating at 1400° C. The resulting melt was cast into a cast-iron mold which was water-cooled, and a columnar shaped body having an outside diameter of 68 mm and a length of 150 mm was produced. This shaped body was released from the mold, gradually cooled to eliminate inner strain and provide a glass shaped body.

This columnar glass shaped body was cut with an inner diameter blade slicing machine equipped with a #325 diamond wheel and disk-shaped bodies 0.7 mm thick were produced. These disk-shaped bodies 6 were ground with a cup-type grindstone and finished into annular amorphous glass plates 12 having an inside diameter of 20 mm and an outside diameter of 66 mm.

The thus obtained amorphous glass plate 12 was held between a pair of pressing setters 17 having surfaces finished into a flatness of 5 µm over a width of 65 mm and thus a sandwiched body was produced. Both of the principal surfaces of the above amorphous glass plate were brought into contact with the flat surfaces, respectively, of the above pressing setters. In a successive sandwiching manner as above, an eight-layered stacked body with the pressing setters 17 on the topmost and bottommost layers was formed. The eight-layered stacked body was held horizontally within an atmospheric tubular furnace made of an alumina tube. In this state, the furnace was hermetically closed, an $N_2$ gas stream was flowed at a flow rate of 1 liter/min. in the furnace, wherein the temperature was kept at 550° C. for 2 hours, then increased at a rate of 125° C./hour until it reached 850° C., thereafter kept at 850° C. for 4 hours, and then cooled down to room temperature.

The above process was conducted on 40 slices in total of the amorphous glass plates 12. As the result, though the amorphous glass plates 12 before crystallization had a flatness with a mean value of 7.1 µm and a standard deviation of 1.7 µm, across their diameter of 65 mm, blands after crystallization had a flatness with a mean value of 4.9 µm and a standard deviation of 1.1 µm, across their diameter of 65 mm. Thus, it was demonstrated that the flatness was appreciably improved. Furthermore, the flatnesses of the resulting crystallized glass substrates were not different between the uppermost substrate and lowermost substrate, in the stack. Thus, blanks with a high flatness were provided.

These blanks were lapped with a #2000 GC abrasive grain, until their thickness was reduced to 0.66 mm, and further lapped with a #4000 GC abrasive grain to a thickness soft 0.64 mm. Thereafter, further polishing was conducted with cerium oxide to a thickness of 0.635 mm and magnetic disc substrates made of crystallized glass having a flatness of 4 μm across their diameter of 65 mm and an average surface roughness of 7 angstroms were obtained.

EXAMPLE 2

A columnar amorphous glass shaped body having an outside diameter of 68 mm and a length of 150 mm which had been obtained in the same manner as EXAMPLE 1 above, was cut with a brade-saw using a 600 GC abrasive grain to produce shaped bodies 0.8 mm thick. Both principal surfaces of these shaped bodies were simultaneously ground with an #800 diamond abrasive grain to provide amorphous glass circular disks 0.7 mm thick. These amorphous glass disks were finished in the same manner as amorphous EXAMPLE 1 to produce doughnut- or annular-shaped amorphous glass plates 12 having an inside diameter of 20 mm and an outside diameter of 66 mm.

Figure 3A:
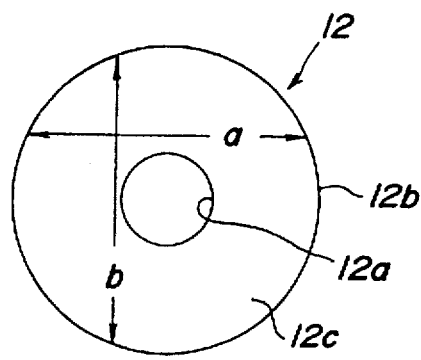
FIG. 3a is a plan view showing an amorphous glass plate 12.
Figure 3B:
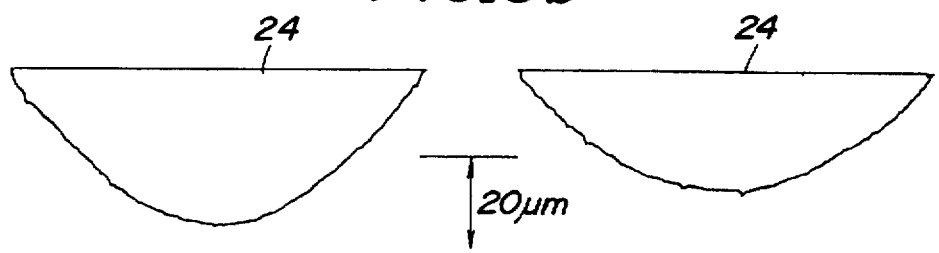
FIG. 3b shows graphs each depicting a profile of an abraded surface of the amorphous glass plate 12.
Figure 3C:
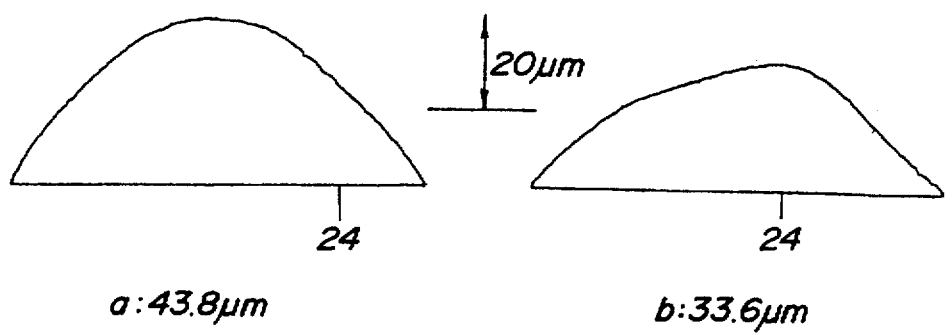
FIG. 3c shows graphs each depicting a profile of another abraded surface of the amorphous glass plate 12.

The abraded surfaces of these amorphous glass plates 12 had a flatness of about 40 μm across the outside diameter. FIG. 3a is a plan view showing this amorphous glass plate 12. One principal surface of this amorphous glass plate 12 had a warp of 41.4 μm in the direction of a and a warp of 31.2 μm in the direction of b, as shown in FIG. 3b. The other principal surface of the amorphous glass plate 12 had a warp of 43.8 μm in the direction of a and a warp of 33.6 μm in the direction of b, as shown in FIG. 3c. Here, 24 is a standard line.

The resulting amorphous glass plates 12 were heat-treated and crystallized in the same manner as EXAMPLE 1. As the result, the flatness of the blanks composed of crystallized glass was improved to 4.3 μm or less across the outside diameter. FIG. 4a is a graph showing a profile of one abraded principal surface of the blank, and FIG. 4b is a graph showing a profile of the other principal abraded surface of the blank, after crystallization treatment.

As described and demonstrated by the EXAMPLES above, according to the process of the invention, glass plates are readily abraded because the abrasion is conducted when the glass material thereof is in an amorphous stage, that is, in a state of relatively low hardness and being liable to abrasion, and moreover, the amorphous glass plates are finished uniformly to have a thickness close to an objective thickness of finished final products, i.e., crystallized glass substrates for magnetic disks, simultaneously with correction of the flatness of the disks. Therefore, it has become possible to markedly reduce abrasion losses of crystallized blanks having a high hardness and thus produce magnetic disk substrates made of crystallized glass with easiness and a low cost.

What is claimed is:

1. A process for manufacturing a crystallized glass substrate for a magnetic disk, sequentially comprising the steps of:

providing an amorphous glass plate having opposed principal surfaces;

providing a pair of pressing setters comprising carbon plates each having a flat surface finished to a flatness of 10 μm or less and each being non-reactive with the amorphous glass plate and undeformable when heated to a crystallization temperature of the amorphous glass plate, the pressing setters preventing warping in the amorphous glass plate during crystallization;

holding the amorphous glass plate between the pair of pressing setters with each of the principal surfaces of the amorphous glass plate brought into contact with a flat surface of one of the pressing setters, respectively;

heating the amorphous glass plate sufficiently to permit the glass to crystallize when cooled;

cooling the glass plate to form a crystallized glass substrate having a flatness within 10 μm in the full field of the substrate surface; and polishing the crystallized glass substrate and removing from the principal surfaces thereof no more than 100 μm of crystallized glass.

2. The process of claim 1 further comprising abrading the principal surfaces of the amorphous glass plate before said holding step to reduce the thickness and flatten the principal surfaces of the amorphous glass plate.

3. The process of claim 1, further comprising, prior to said heating step, pre-heating the amorphous glass plate for a predetermined length of time at a first temperature, to soften the amorphous glass plate and cause the principal surfaces thereof to conform to the flat surfaces of the pressing setters, respectively.

4. The process of claim 3, wherein the first temperature of said pre-heating step is above an annealing point of a glass material of the amorphous glass plate, but below the temperature of said heating step.

5. The process of claim 1, wherein no more than 50 μm of crystallized glass is removed.

6. The process of claim 1, wherein said heating step is performed in an inert atmosphere or reducing atmosphere.

* * * * *